Figure 3:
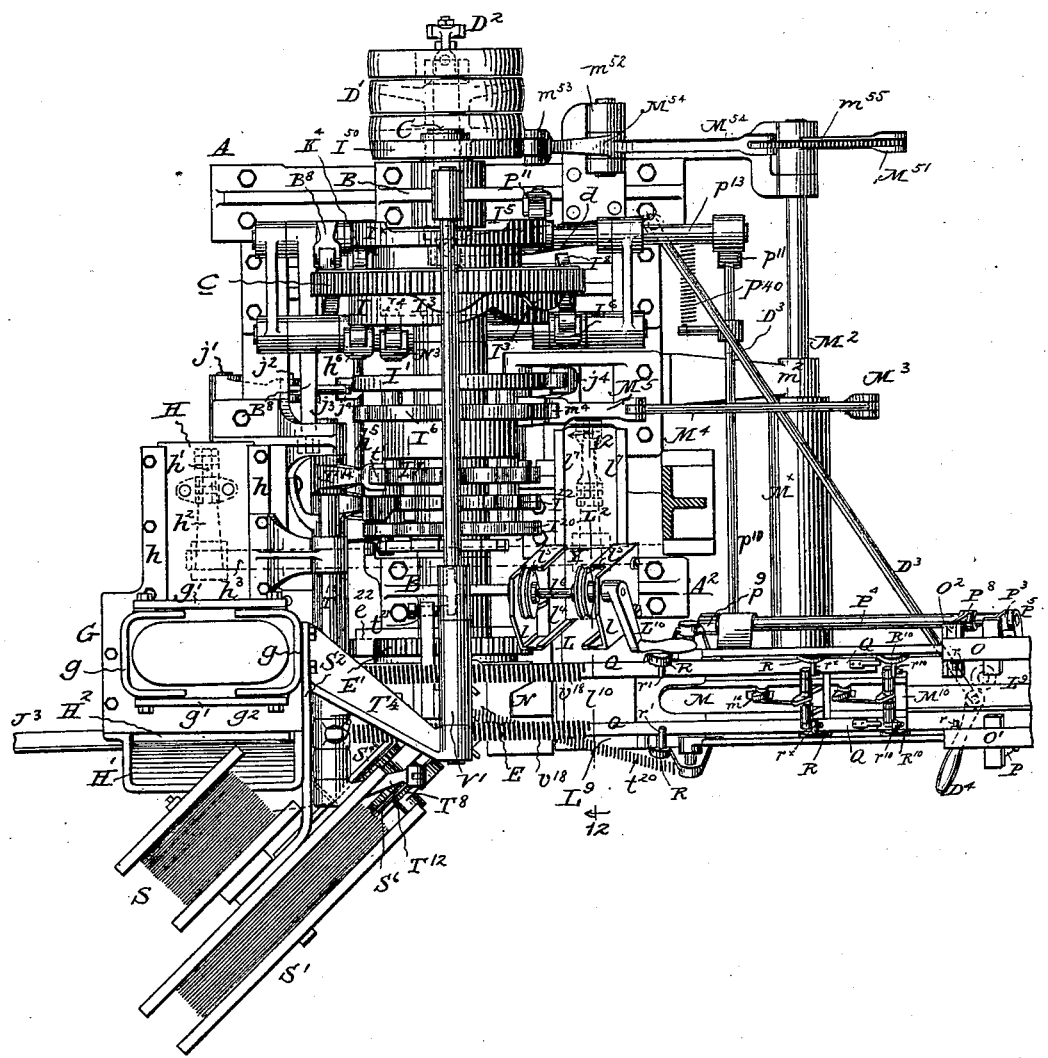

No. 690,322. Patented Dec. 31, 1901.
O. MERGENTHALER, Dec'd.
SAFE DEPOSIT & TRUST CO. OF BALTO., AND A. GREENLEAF, Executors.
BASKET MAKING MACHINERY.
(Application filed June 26, 1901.)
(No Model.) 11 Sheets—Sheet 1.
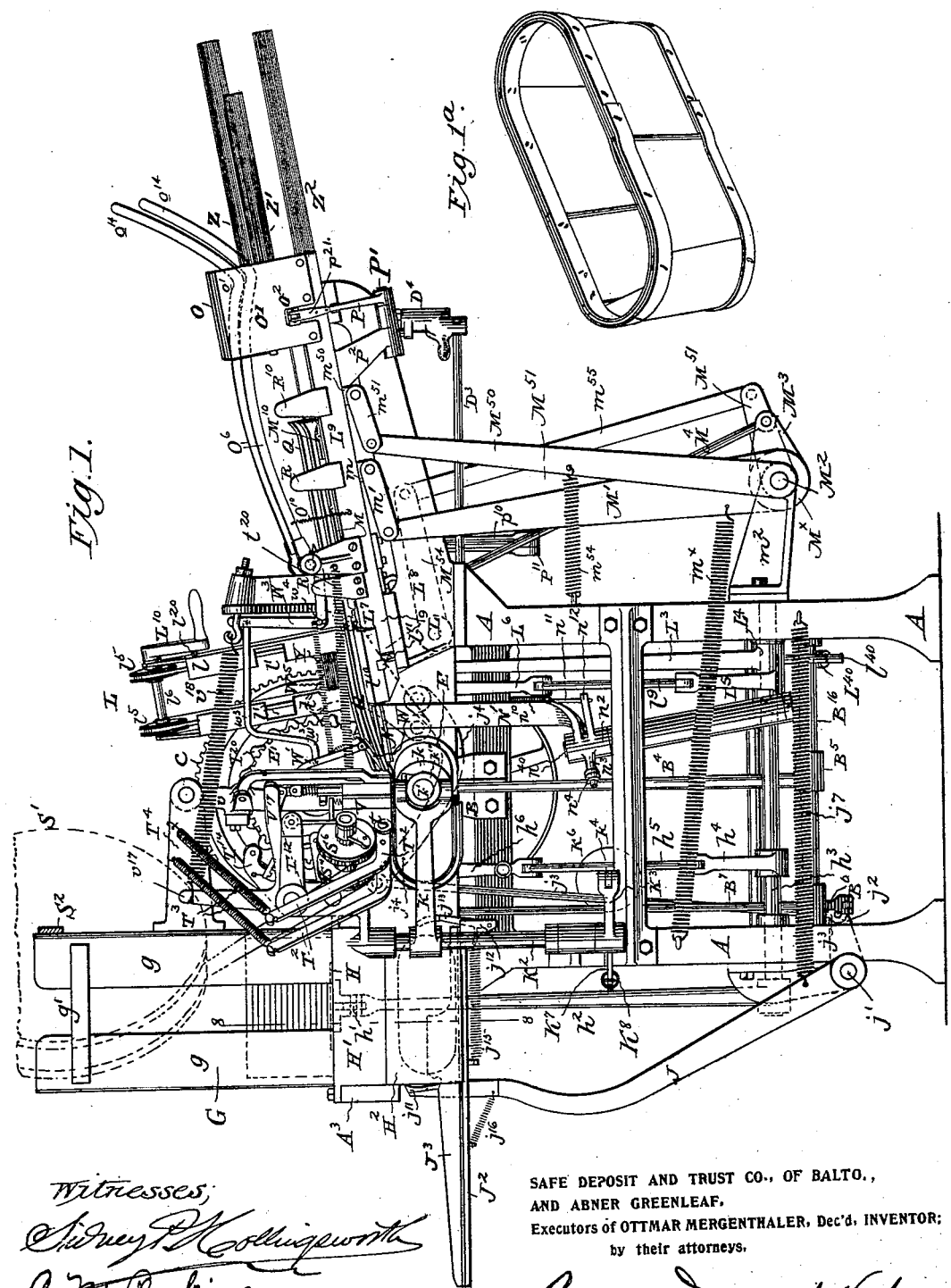
Witnesses;
SAFE DEPOSIT AND TRUST CO., OF BALTO.,
AND ABNER GREENLEAF,
Executors of OTTMAR MERGENTHALER, Dec'd, INVENTOR;
by their attorneys, No. 690,322.  
O. MERGENTHALER, Dec'd.  
SAFE DEPOSIT & TRUST CO. OF BALTO., AND A. GREENLEAF, Executors.  
BASKET MAKING MACHINERY.  
(Application filed June 26, 1901.)

Patented Dec. 31, 1901.

(No Model.)  
11 Sheets—Sheet 2.

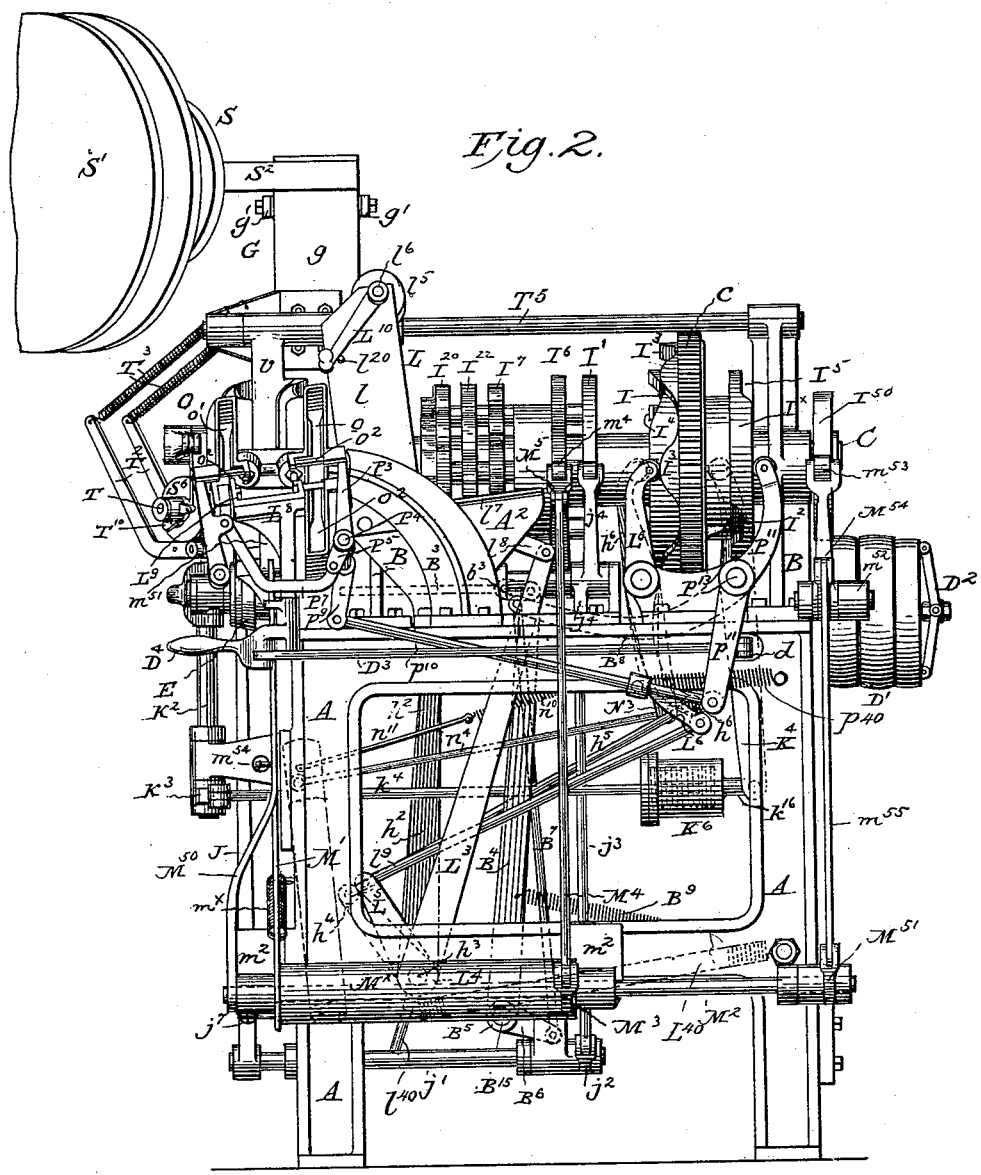

Fig. 2.

Witnesses  
Sidney P. Hollingsworth  
W. M. Parkins.

SAFE DEPOSIT AND TRUST CO., OF BALTO.,  
AND ABNER GREENLEAF,  
Executors of OTTMAR MERGENTHALER, Dec'd, INVENTOR:  
by their attorneys,  
Baldwin Davidson & Wight.

THE NORRIS PETERS CO., PHOTO-LITHO., WASHINGTON, D. C.

No. 690,322. Patented Dec. 31, 1901.
O. MERGENTHALER, Dec'd.
SAFE DEPOSIT & TRUST CO. OF BALTO., AND A. GREENLEAF, Executors.
BASKET MAKING MACHINERY.
(Application filed June 26, 1901.)
(No Model.) 11 Sheets—Sheet 3.

SAFE DEPOSIT AND TRUST CO., OF BALTO.,
AND ABNER GREENLEAF,
Executors of OTTMAR MERGENTHALER, Dec'd, INVENTOR;
by their attorneys, No. 690,322. Patented Dec. 31, 1901.
O. MERGENTHALER, Dec'd.
SAFE DEPOSIT & TRUST CO. OF BALTO., AND A. GREENLEAF, Executors.
BASKET MAKING MACHINERY.
(Application filed June 26, 1901.)
(No Model.) 11 Sheets—Sheet 4.
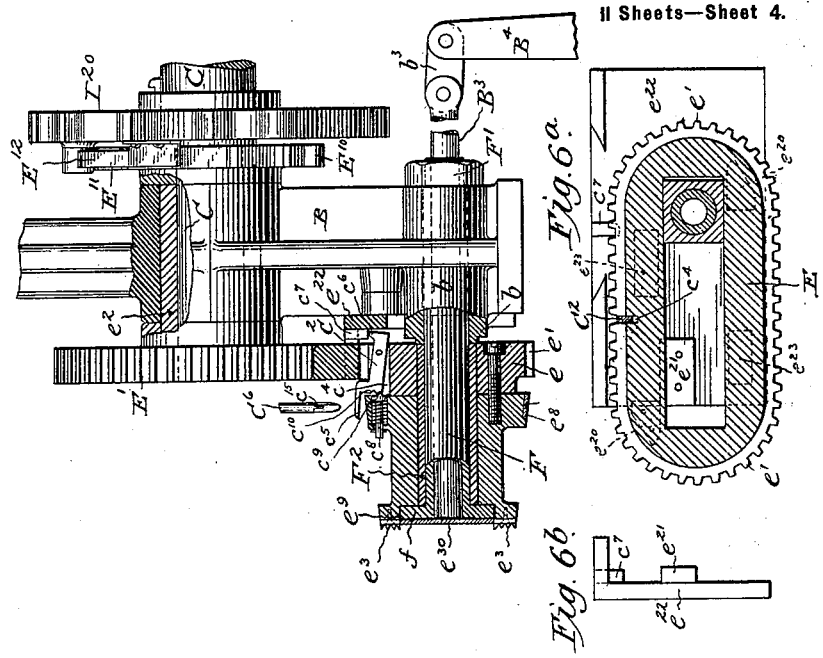
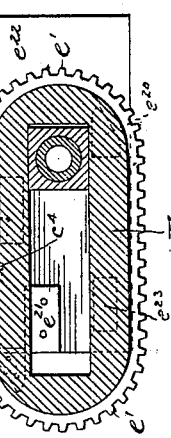
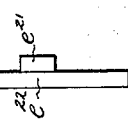
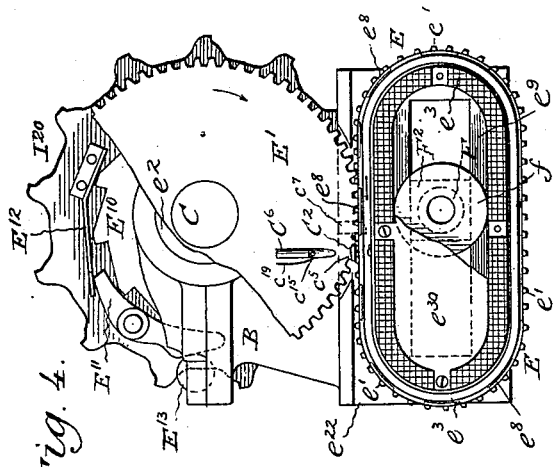
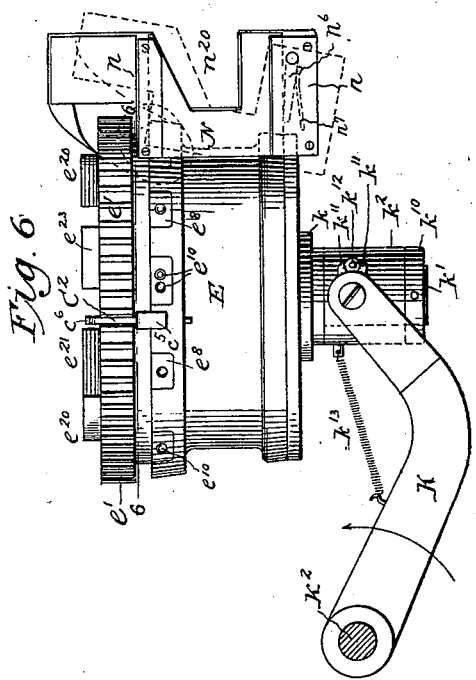
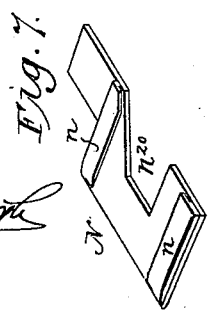
Witnesses:
SAFE DEPOSIT AND TRUST CO., OF BALTO.,
AND ABNER GREENLEAF,
Executors of OTTMAR MERGENTHALER, Dec'd, INVENTOR;
by their attorneys.

No. 690,322. Patented Dec. 31, 1901.
O. MERGENTHALER, Dec'd.
SAFE DEPOSIT & TRUST CO. OF BALTO., AND A. GREENLEAF, Executors.
BASKET MAKING MACHINERY.
(Application filed June 26, 1901.)
(No Model.) 11 Sheets—Sheet 5.
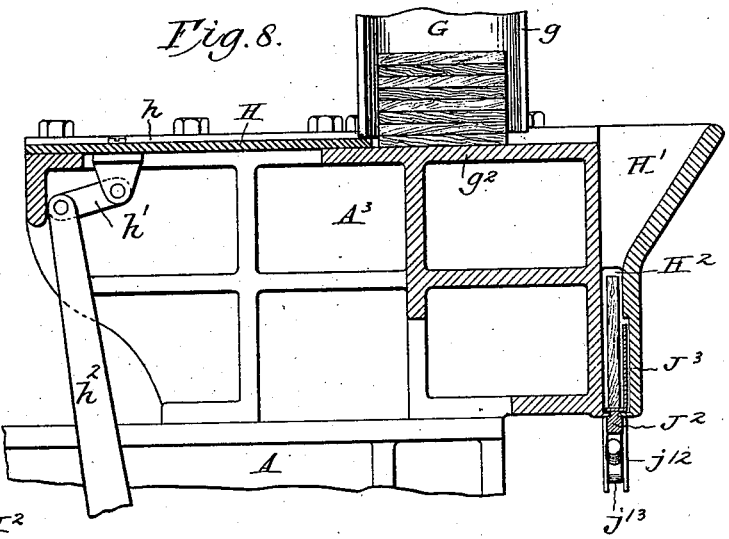
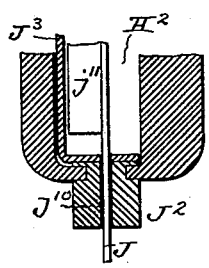
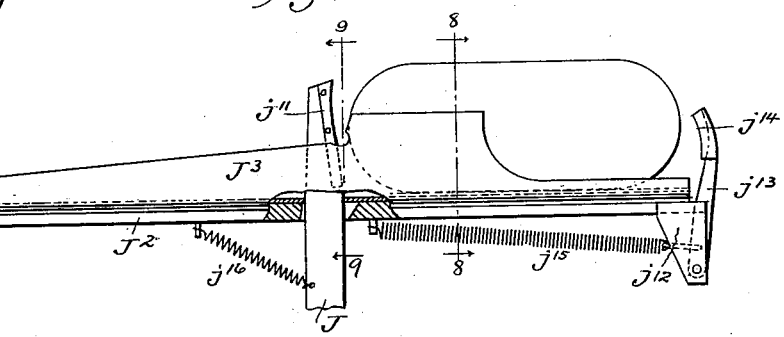
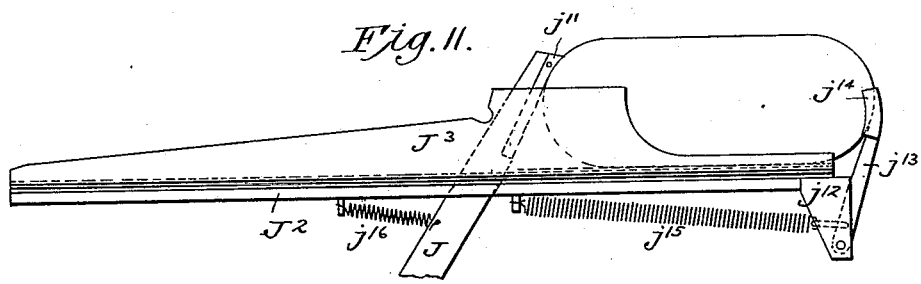
Witnesses:
Sidney F. Hollingsworth
A. M. Parkins.
SAFE DEPOSIT AND TRUST CO., OF BALTO.,
AND ABNER GREENLEAF,
Executors of OTTMAR MERGENTHALER, Dec'd, INVENTOR:
by their attorneys,
Baldwin, Davidson & Wight.

No. 690,322. Patented Dec. 31, 1901.
O. MERGENTHALER, Dec'd.
SAFE DEPOSIT & TRUST CO. OF BALTO., AND A. GREENLEAF, Executors.
BASKET MAKING MACHINERY.
(Application filed June 26, 1901.)
(No Model.) 11 Sheets—Sheet 6.
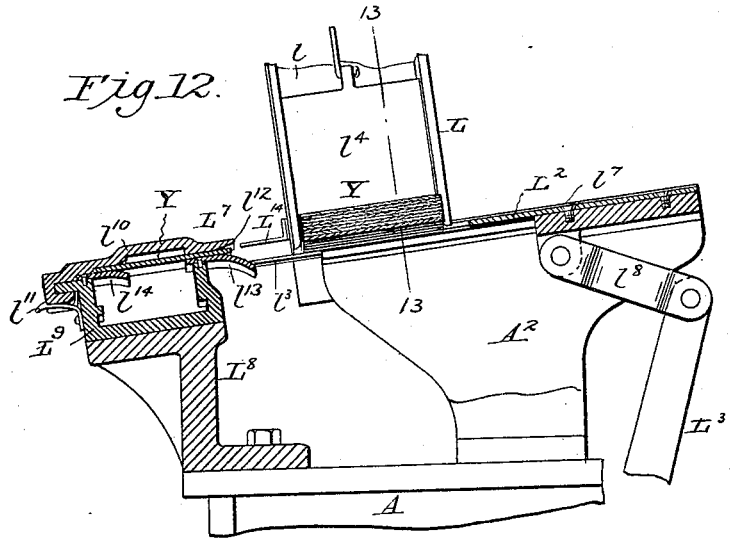
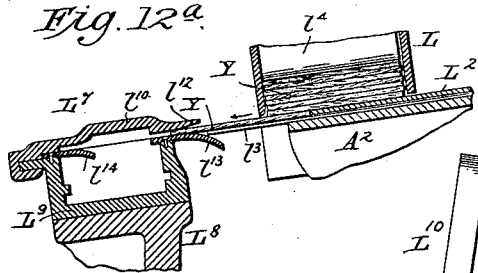
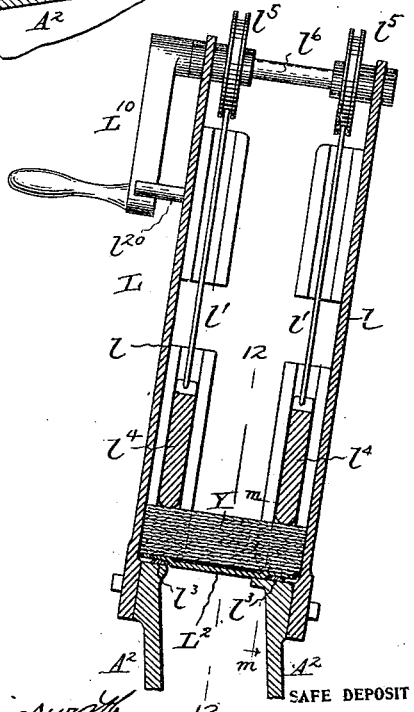
SAFE DEPOSIT AND TRUST CO., OF BALTO.,
AND ABNER GREENLEAF,
Executors of OTTMAR MERGENTHALER, Dec'd, INVENTOR:
by their attorneys, No. 690,322. Patented Dec. 31, 1901.
O. MERGENTHALER, Dec'd.
SAFE DEPOSIT & TRUST CO. OF BALTO., AND A. GREENLEAF, Executors.
BASKET MAKING MACHINERY.
(Application filed June 26, 1901.)
(No Model.) 11 Sheets—Sheet 7.
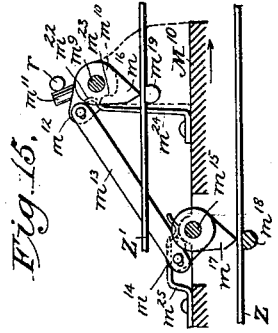
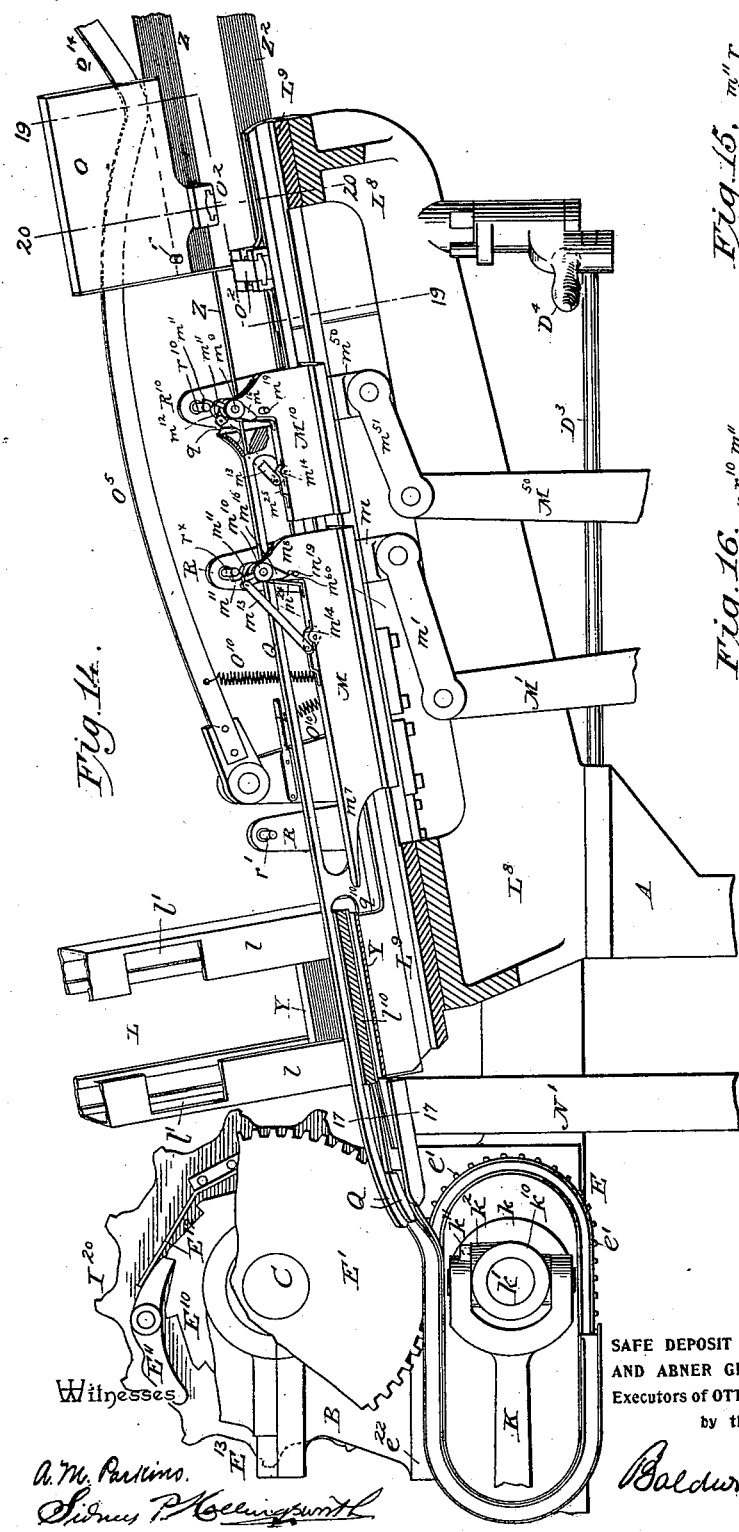
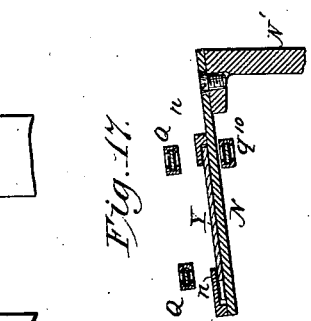
SAFE DEPOSIT AND TRUST CO., OF BALTO.,
AND ABNER GREENLEAF,
Executors of OTTMAR MERGENTHALER, Dec'd, INVENTOR:
by their attorneys, No. 690,322. Patented Dec. 31, 1901.
O. MERGENTHALER, Dec'd.
SAFE DEPOSIT & TRUST CO. OF BALTO., AND A. GREENLEAF, Executors.
BASKET MAKING MACHINERY.
(Application filed June 26, 1901.)
(No Model.) 11 Sheets—Sheet 8.
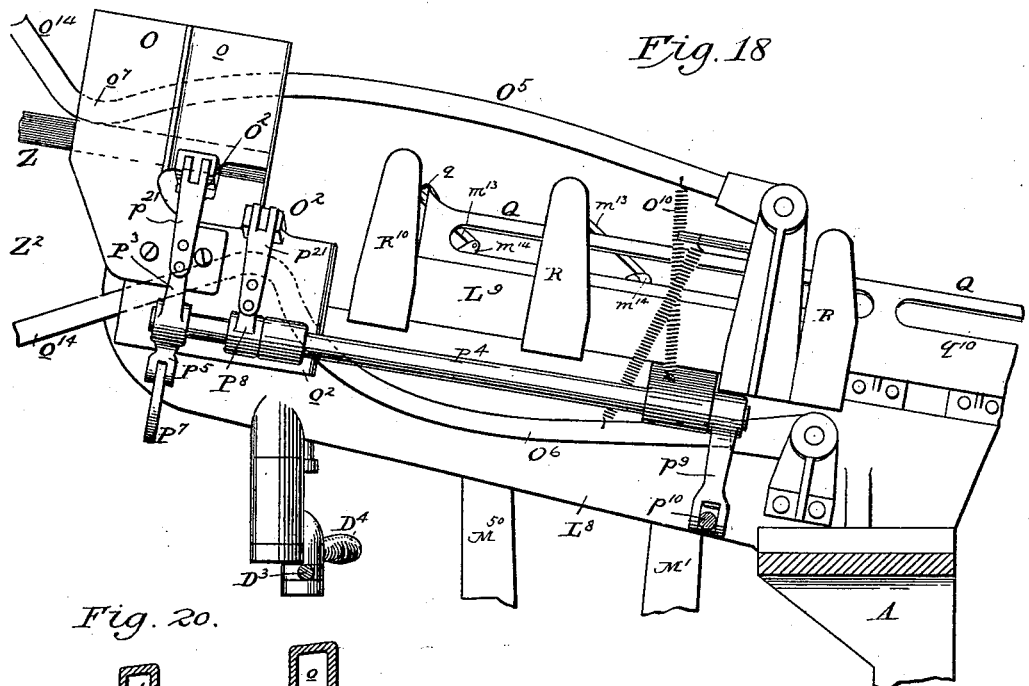
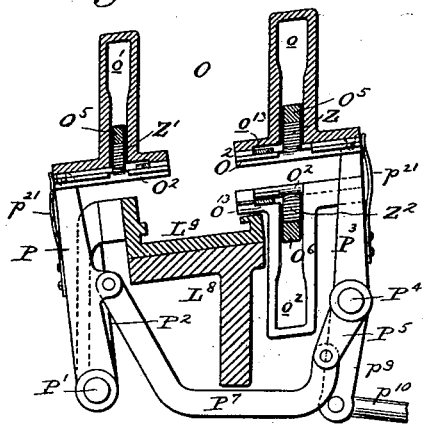
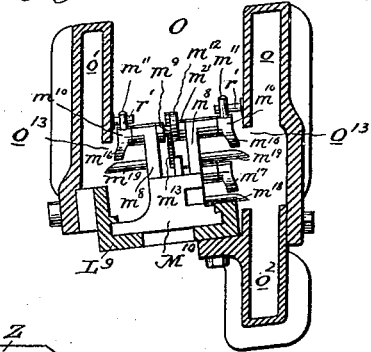
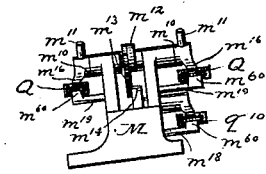
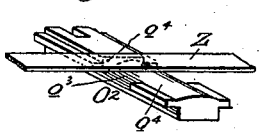
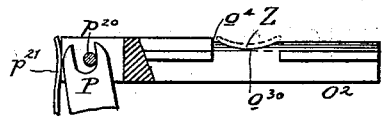
Witnesses
SAFE DEPOSIT AND TRUST CO., OF BALTO.,
AND ABNER GREENLEAF,
Executors of OTTMAR MERGENTHALER, Dec'd, INVENTOR;
by their attorneys, No. 690,322. Patented Dec. 31, 1901.
O. MERGENTHALER, Dec'd.
SAFE DEPOSIT & TRUST CO. OF BALTO., AND A. GREENLEAF, Executors.
BASKET MAKING MACHINERY.
(Application filed June 26, 1901.)

(No Model.) 11 Sheets—Sheet 9.

Witnesses;

SAFE DEPOSIT AND TRUST CO., OF BALTO.,
AND ABNER GREENLEAF,
Executors of OTTMAR MERGENTHALER, Dec'd, INVENTOR;
by their attorneys, No. 690,322. Patented Dec. 31, 1901.
O. MERGENTHALER, Dec'd.
SAFE DEPOSIT & TRUST CO. OF BALTO., AND A. GREENLEAF, Executors.

BASKET MAKING MACHINERY.

(Application filed June 26, 1901.)

(No Model.) 11 Sheets—Sheet 10.

SAFE DEPOSIT AND TRUST CO., OF BALTO.,
AND ABNER GREENLEAF,
Executors of OTTMAR MERGENTHALER, Dec'd, INVENTOR;
by their attorneys, No. 690,322. Patented Dec. 31, 1901.
O. MERGENTHALER, Dec'd.
SAFE DEPOSIT & TRUST CO. OF BALTO., AND A. GREENLEAF, Executors.
BASKET MAKING MACHINERY.
(Application filed June 26, 1901.)
(No Model.) 11 Sheets—Sheet 11.

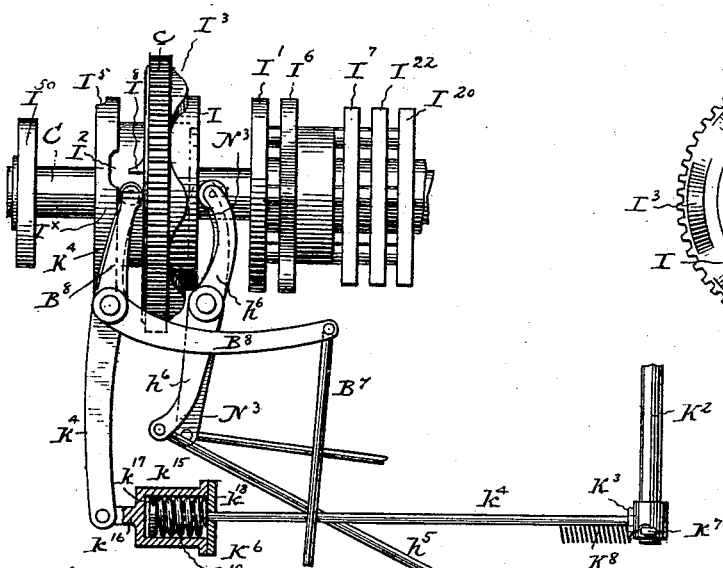

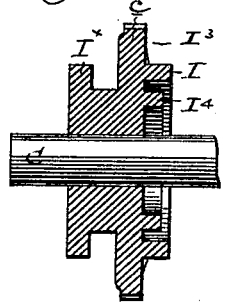

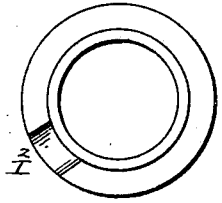
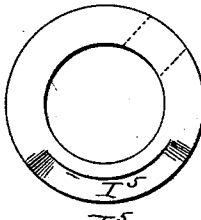
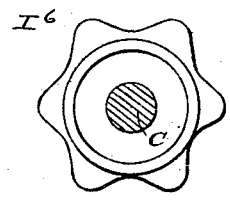
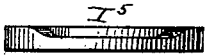

Witnesses;
Sidney P. Hollingsworth
A. M. Parkins.

SAFE DEPOSIT AND TRUST CO., OF BALTO.,
AND ABNER GREENLEAF,
Executors of OTTMAR MERGENTHALER, Dec'd, INVENTOR:
by their attorneys,
Baldwin, Davidson & Wight.

THE NORRIS PETERS CO., PHOTO-LITHO., WASHINGTON, D. C.

UNITED STATES PATENT OFFICE.

SAFE DEPOSIT & TRUST CO. OF BALTO. AND ABNER GREENLEAF, OF BALTIMORE, MARYLAND, EXECUTORS OF OTTMAR MERGENTHALER, DECEASED, ASSIGNORS TO HORTON BASKET MACHINE COMPANY, OF NEW YORK, N. Y., A CORPORATION OF WEST VIRGINIA.

BASKET-MAKING MACHINERY.

SPECIFICATION forming part of Letters Patent No. 690,322, dated December 31, 1901.

Application filed June 26, 1901. Serial No. 66,117. (No model.)

*To all whom it may concern:*

Be it known that OTTMAR MERGENTHALER, now deceased, formerly a citizen of the United States, and a resident of the city of Baltimore, Maryland, did invent certain new and useful Improvements in Basket-Making Machinery, of which the following is a specification.

This invention relates particularly to the class of basket-making machines which construct baskets by assembling wooden bottom pieces, veneer side pieces, and wooden bands about a form and securing them together by staples to produce an oblong basket with a single band around its lower end and inside and outside bands at its upper end. This basket is known to the trade as the "Climax" grape-basket. Letters Patent of the United States No. 530,048, granted to Emmet Horton November 27, 1894, show the first automatic machine for making baskets of this kind. The present invention constitutes improvements on the machine shown in that patent.

The objects of the present invention are mainly to simplify the construction of the mechanism for assembling the bottom, sides, and bands around the form and for securing them together and at the same time to render the mechanism more reliable in action and capable of moving at a higher speed with less jar and fewer errors.

The first part of the invention relates to the mechanism for feeding the basket-bottoms. In the Horton machine the bottoms are held in a pile in a magazine, from which they are carried to the form by a crane provided with gripping-jaws, which take the bottoms one at a time from the pile, swing them around to the form, and deliver them thereto. By the present invention the same result is effected by arranging the bottoms in a magazine across the lower end of which reciprocates a slide which delivers the bottoms one at a time to a narrow chamber that holds them vertically in line with the end of the form, which is arranged on a horizontal axis. The upper end of a feed-lever provided with clamping devices reciprocates through the narrow chamber and moves each basket-bottom into position in front of the form, where it is taken by another lever moving at right angles to the feed-lever and pressed against the end of the form and held there during the construction of the basket. This mechanism for feeding the bottoms has no delicately-constructed devices, the parts are few in number, and the liability of their getting out of order or failing to operate is extremely remote.

The next part of the invention relates to the mechanism for feeding the sides. In the Horton machine the sides are fed to the form by a system of levers, one part of which lifts the sides one at a time from a pile and delivers them to guides which present them to other levers that carry them to the form. In the machine constructed in accordance with the present invention the sides are fed from their magazine by a slide to a pocket in line with another slide which moves them onto a table from which they pass to the form. The slide which feeds the sides to the form also feeds the bands thereto, as will be hereinafter explained. It is sometimes desirable that the sides be made to slightly overlap in the completed basket, and devices are employed in the present invention for causing the side pieces to overlap while they are being secured together.

The next part of the invention relates to the band-feeding mechanism. In the machine illustrated in Horton's patent above mentioned there are two independent mechanisms for feeding the upper and lower bands. The upper bands are fed from a single pile, and a separator is employed for separating the band for the inside of the basket from the band for the outside thereof before the bands are fed to the form, which is done by a system of levers, plungers, and guides. In the present machine the bands are held in stacks in separate compartments of a magazine, from which they are delivered laterally to a slide which transfers them to guides from which they are taken by another slide which reciprocates toward and from the form and feeds the bands thereto. As the bands are fed forward a side piece is taken up by the slide, which delivers it with the bands to the form. Enough side pieces are fed to the form by the slide for completing a basket without feeding the bands by the slide, as the bands are drawn forward without being actuated by the slide after the first side piece has been secured to the bands.

The staples in the present improved machine are, as in the Horton machine, preferably made from continuous lengths of wire and driven into the stock immediately after being formed. In the Horton machine the form stops each time that a staple is driven, while in the present improved machine the stapling mechanism moves with the form during the operation of driving a staple, and thus considerable speed is gained in constructing the basket.

The machine contains, in addition to the features above named, many novel organizations of mechanism and details of construction, which shall be hereinafter fully described.

There are no mutilated gears in this machine, the working parts thereof for the most part being driven by cams on a single cam-shaft, which actuates levers connected by rods with the parts to be operated. Some few parts, however, are actuated by spur-wheels or by ratchet mechanism which is so constructed and operated as to work smoothly and without material interruption.

The accompanying drawings show a basket-making machine embodying the present improvements in what is believed to be the best and most efficient form. Some parts of the mechanism may be employed without others or in machines different in other respects from that herein described. While the machine is designed to be entirely automatic, yet the invention is not limited to a machine automatic in all respects, as many parts of the mechanism are novel in themselves and might be used in semi-automatic machines or those operated partly by hand. The novel subject-matter will be distinctly set forth in the claims.

Figure 23:
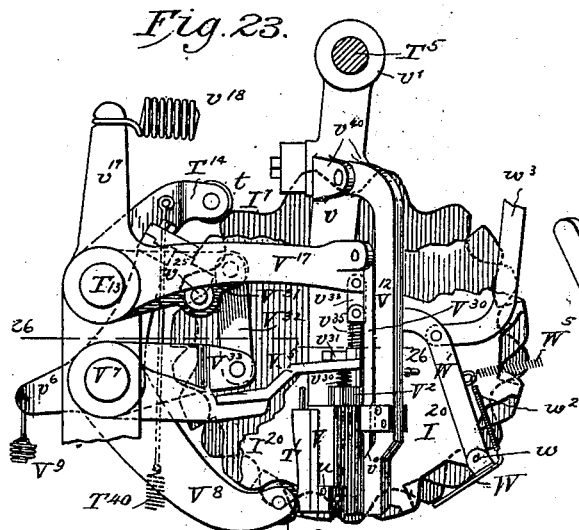
Figure 24:
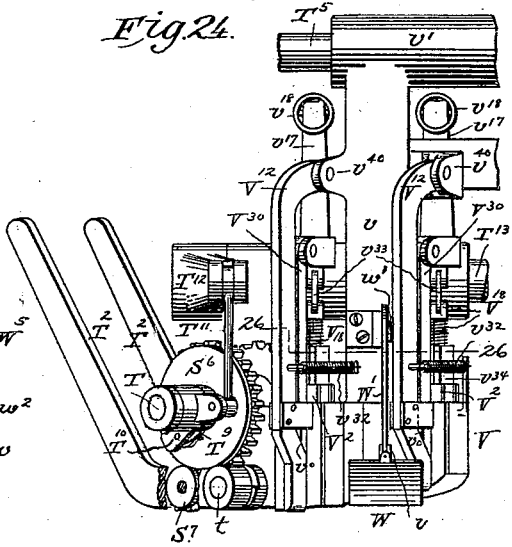
Figure 25:
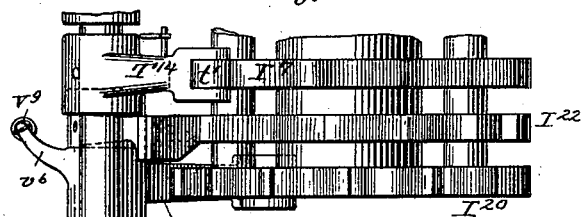
Figure 26:
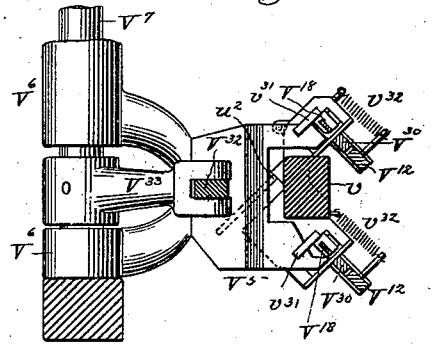
Figure 27:
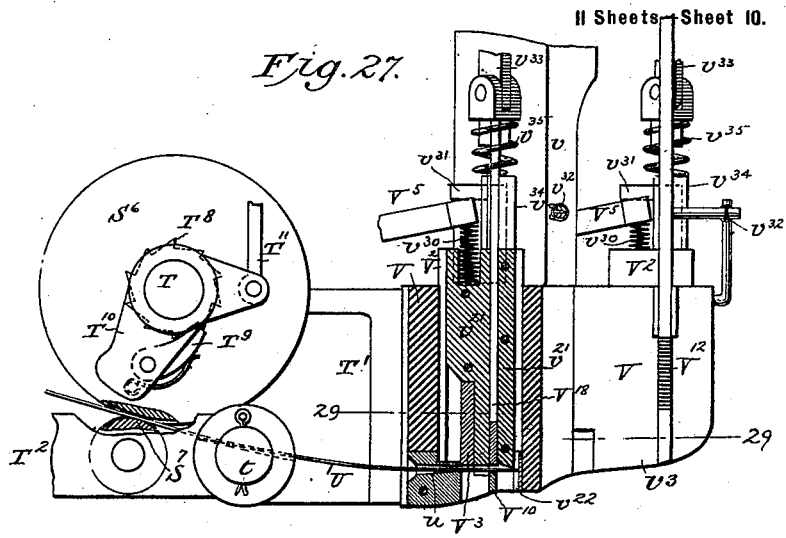
Figure 28:
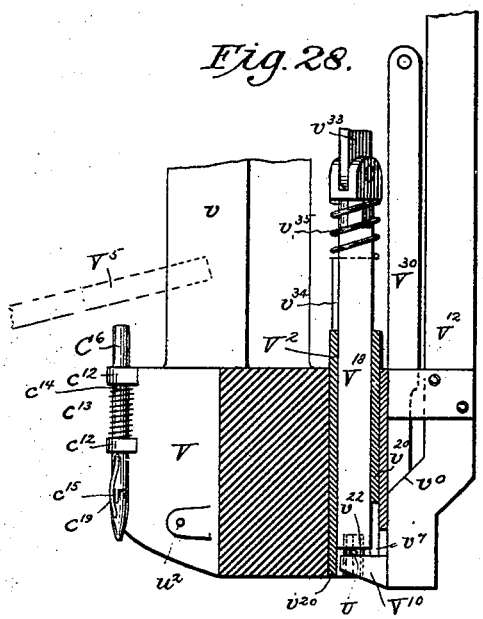
Figure 29:
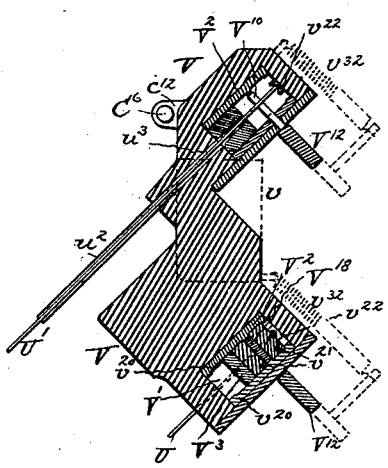

Figure 1 shows a front elevation of the machine. Fig. 1ª is a perspective view of the basket formed by the machine. Fig. 2 shows an elevation of the right-hand side of the machine. Fig. 3 shows a plan view. The remaining figures are on a somewhat-enlarged scale. Fig. 4 is a detail view showing particularly the mechanism for operating the form. Fig. 5 is a detail view showing particularly the mechanism for operating the form and the ejector with part of its connections. Fig. 6 shows a plan view of the form, the table for adjusting the side pieces while being delivered to the form, and the pressure-lever which holds the bottom pieces against the form. Fig. 6ª is a detail view showing how the form is supported and guided. Fig. 6ᵇ is a detail view of some of the devices for supporting and guiding the form. Fig. 7 is a perspective view of the adjusting-table. Fig. 8 is a detail view showing particularly the mechanism for delivering the bottom pieces from their magazine. Fig. 9 is a detail view in section on the line 9 9 of Fig. 10 of the feed mechanism which delivers the bottom pieces to the form. Fig. 10 is a detail view, partly in elevation and partly in section, of this mechanism. Fig. 11 is a similar view showing the parts in a different position. Fig. 12 is a detail view, partly in elevation and partly in section on the line 12 12 of Fig. 3, of part of the mechanism for delivering the side pieces from their magazine. Fig. 12ª shows a section on the line m m of Fig. 13. Fig. 13 shows a section on the line 13 13 of Fig. 12. Fig. 14 is a detailed view showing particularly the mechanism for delivering the bands and sides from their magazines to the form, the bands-compartment and bands nearest the observer being omitted and some other parts of the mechanism being omitted to better illustrate other parts. Figs. 15 and 16 are detail views of part of the band-feeding devices. Fig. 17 is a detail view in section of the guides for the bands and the table which adjusts the side pieces on the form. Fig. 18 is another view in elevation of the band-feeding mechanism. Fig. 19 shows a transverse section of the band-feeding mechanism on the line 19 19 of Fig. 14. Fig. 20 is a similar view on the line 20 20 of Fig. 14. Fig. 20ª is a detail view of the band-feeding mechanism. Figs. 21 and 22 are detail views of the band-shifting mechanism which moves the bands laterally from their compartments into engagement with the slide which carries them toward the form. Fig. 23 is a detail view of the nailing mechanism, showing clearly how the cams operate this mechanism. Fig. 24 is a side elevation of the nailing mechanism. Fig. 25 is a plan view thereof, and this figure also shows in plan the cams and their connections for operating the nailing mechanism. Fig. 26 is a detail view in section on the line 26 26 of Fig. 24. Fig. 27 is another detail view of the nailing mechanism and also of the wire-feeding devices. The view is partly in elevation and partly in section on the line 27 27 of Fig. 25. Fig. 28 is another detail view, partly in elevation and partly in section, on the line 28 28 of Fig. 25. Fig. 29 shows a transverse section on the line 29 29 of Fig. 27. Fig. 30 is a diagram view of the main cam-shaft with the cams thereon, and this figure illustrates also the mechanism on the left-hand side of the machine which connects the cams with the parts of the machine which they operate. Fig. 31 shows a front elevation of one of the cam-disks with three of the cams thereon, the main spur-wheel being also formed on or secured to this disk. Fig. 32 is a detail view showing some of the cams in vertical section. Fig. 33 is a detail view of the cam which operates the mechanism for delivering the bottoms from their magazine. Fig. 34 is a front elevation of the cam for operating the slide which moves the bottoms to the form. Fig. 35 is a front elevation of the cam which operates the pressure-lever. Fig. 36 is a rear elevation of the cam which operates the mechanism which shifts the bands sidewise and moves them into engagement with the slide which delivers them to the form. Fig. 37 is an edge view thereof. Fig. 38 is a view of the cam which operates the mechanism to feed the bands and the side pieces to the form. Fig. 39 is a view of the cam for operating part of the band-feeding mechanism.

The main frame A may be of any suitable construction so long as it is adapted to support the operating parts of the machine or carries brackets or other additional devices for this purpose. To the top of the main frame near its front and rear ends are secured upright posts B, which are provided with bearings for a horizontal shaft C, which extends from front to rear of the machine and carries the cams and gears for imparting motion from the cam-shaft to the basket-forming mechanism. The cam-shaft is provided with a spur-wheel $c$, which meshes with a pinion $c'$ on a shaft D, which carries driving-pulleys D'. These pulleys are loose on the shaft; but one of them may be connected therewith by means of a clutch $D^2$ of well-known construction, which is connected, as shown in Fig. 3, with a lever $d$, to which is jointed a rod $D^3$, the front end of which is jointed to a hand-lever $D^4$ at the front end of the machine within convenient reach of the attendant. By this means the machine may be started and stopped at will.

The form E, about which the basket is constructed, is shaped as shown particularly in Figs. 4, 5, 6, and 6$^a$, and it has secured to its inner or larger end an oval plate $e$, provided with an oval series of teeth $e'$, which mesh with a spur-wheel $E'$, secured to a sleeve $e^2$, loose on the front end of the shaft C. To the sleeve $e^2$ is secured a ratchet-wheel $E^{10}$, with which engages a pawl $E^{11}$, secured to a cam $I^{20}$, that is rigidly connected with the cam-shaft C. A spring $E^{12}$, secured to the cam, bears on the end of the pawl and tends to keep it in engagement with the teeth of the ratchet-wheel. As the cam rotates, the ratchet-wheel is driven, and consequently the spur-wheel E' is revolved; but at one time during the rotation of the cam-shaft the pawl $E^{11}$ is disengaged from the ratchet-wheel, and during this time the cam-shaft revolves without imparting motion to the spur-wheel $E'$, and therefore during this time the form is at rest. This stoppage in the motion of the form is produced by means of a lug $E^{13}$, secured to the front post B. At the proper time the tail of the pawl $E^{11}$ moves into contact with the lug $E^{13}$, and the nose of the pawl is withdrawn from the teeth of the ratchet-wheel $E^{10}$, as shown in Fig. 4. The purpose of this arrangement is to stop the movement of the form while a basket is being ejected and a new bottom piece is being placed in position. The form is provided on its front end with an oval roughened or serrated surface $e^3$ to prevent the bottom piece from slipping after it is once placed in position. To the front of the form a plate $e^{30}$ is preferably secured in order to prevent loose pieces of staple-wire from getting into the mechanism and jamming it. The front of the plate $e^{30}$ is secured to the form in such manner that it will lie in rear of the front serrated surface thereof. The form is supported by a hollow bar or sleeve F, which extends through the lower end of the front post B, being screw-threaded at its rear end and held in place by a nut F'. The front end of the sleeve F is provided with a circular head $f$, which fits in a recess or depression $e^9$ in the front end of the form and prevents the form from moving sidewise. Between the head $f$ and the end of the hub $b$ on the post B is interposed a square sleeve $F^2$. This sleeve is square on its exterior, but has a cylindrical bore and is free to rotate on the sleeve F. The sleeve $F^2$ projects through a rectangular opening in the form, as clearly shown in Figs. 4 and 5. As the spur-wheel E' revolves, the form is moved horizontally in the direction indicated in Fig. 4, then turned about one of its ends, then moved horizontally again in the opposite direction, then turned on its opposite end, and so on. The squared shape of the sleeve $F^2$ holds the form in proper position at all times to be properly operated by the spur-wheel E'.

Secured to the rear end of the form, near two diagonally opposite corners, are blocks $e^{20}$, which are adapted to slide on a rail $e^{21}$, projecting forwardly from a plate $e^{22}$, that is secured to the main frame. By this construction the form is supported by the rail and held in proper position, especially when it is near the end of one of its movements to the right or left—i. e., when the sleeve $F^2$ is at one of the ends of the rectangular opening in the form. The blocks are, however, so arranged as to permit the form to tilt and turn at the proper times.

$e^{23}$ indicates filling-pieces interposed between the form and the plate $e^{22}$ and secured to the form. They serve to prevent the form from moving backward toward the plate $e^{22}$.

The ejector $B^3$ is shown in Fig. 5. It operates through the sleeve F; but the details of its operation will be described later on.

In order to clench the staples and prevent undue wear on the main casting of the form, a series of hardened-steel plates $e^8$ are employed. These are let into the form at its inner or larger end and are secured thereto in any suitable way. These plates are provided with concave depressions $e^{10}$, so shaped as to receive the ends of the staples after they are driven through the sides and bands and turn them so as to properly clench them.

The boards for forming the bottoms of the basket are stored in a magazine G, mounted on the bracket $A^3$ of the main frame at its front left-hand end. The magazine is constructed of two vertical trough-plates $g$, resting on the bracket $A^3$ and open at their top ends, being braced at their upper ends by tie-rods $g'$. The bottoms lie flatwise in a vertical pile in the magazine, the lowermost bottom resting on the shelf $g^2$ below it, and just over the shelf the front and rear lower ends of the troughs are cut away to permit a slide H to reciprocate across the shelf and deliver the bottom boards one at a time from the pile through the opening in the lower end of the front trough, which opening is just large enough to allow only one bottom at a time to be delivered through it. This slide is mounted to reciprocate in guides $h$, and it delivers the bottoms one at a time to a hopper H', having an inclined front wall which directs the bottoms into a narrow vertical chamber $H^2$, in which the bottoms lie vertically, as indicated in Fig. 8. The slide H is connected by a link $h'$ with a lever $h^2$, secured to a rock-shaft $h^3$, (see Fig. 1,) mounted in suitable bearing-brackets and carrying an arm $h^4$, connected by a rod $h^5$ with a lever $h^6$, operated by the cam I on the main cam-shaft C. (See Fig. 3.) The slide is so operated as to feed the bottoms one at a time and at proper intervals to the chamber $H^2$, from which they are fed to the form by the mechanism shown particularly in Figs. 9, 10, and 11.

The bottom of the chamber $H^2$ is provided with a slotted opening, in which reciprocates a slide-bar $J^2$. Secured to the top of this slide is a plate $J^3$, L-shaped in cross-section, as indicated in Fig. 9. A lever J, secured to a shaft $j'$, Fig. 1, mounted in bearings at the lower end of the main frame, extends upwardly through a vertical opening $j^{10}$ in the slide-bar $J^2$ and through an opening in the plate $J^3$. To the upper end of this lever is secured a curved plate or shoe $j^{11}$, adapted to engage with one end of the bottom piece delivered to the chamber $H^2$ in the manner indicated in Fig. 11. On the right-hand end of the slide-bar $J^2$ is secured a hanger $j^{12}$, to which is pivoted an upwardly-projecting arm $j^{13}$, carrying a shoe $j^{14}$, adapted to engage the opposite or right-hand end of the bottom piece. The arm $j^{13}$ is drawn toward the bottom piece by a spring $j^{15}$, while a spring $j^{16}$ connects the lever J with the slide $J^2$. The plate $J^3$ is so shaped, as indicated in Fig. 10, that the bottom board is held vertically and prevented from falling out forwardly, but the plate is terminated or cut away to allow the pressure-lever to operate, as hereinafter described. The mechanism shown in Figs. 10 and 11 constitutes what may be called a "clamp," which grasps the bottom piece and feeds it from the chamber $H^2$ to its position in front of the form. Fig. 10 shows the position which the parts occupy when a bottom piece is fed down into the chamber $H^2$. When the lever J is moved to the right, the bottom piece is moved endwise against the shoe $j^{14}$, and the spring $j^{15}$ is put under tension in the manner indicated in Fig. 11. This figure indicates the position which the parts occupy when the pressure-lever operates to press the bottom against the end of the form. The shaft $j'$ carries an arm $j^2$, connected by means of a rod $j^3$ with a rocking lever $j^4$, which engages a cam I', Fig. 3, on the cam-shaft C. It should be here stated that the lever J is pulled in one direction by a spring $j^7$. (Shown in Fig. 1.) The cam I' moves the lever J backward, while the spring $j^7$ draws the lever forward to feed the bottom piece to the form in the manner indicated in Fig. 1. In like manner the lever $h^2$ is drawn in one direction by a spring $h^7$, (not shown, but applied in any suitable way,) while moved in the opposite direction by the cam I.

As before stated, the bottom pieces are fed into position in front of the form, where they are pressed against the end of the form by a pressure-lever. This pressure-lever K is provided on its right-hand end in front of the form with a disk $k$, carried by a short shaft $k'$, arranged to turn in bearings in a sleeve $k^2$, pivoted on the bifurcated end of the lever K. The disk bears against the basket-bottom and is free to turn as the basket turns while being constructed. A collar $k^{10}$ is secured to the outer end of the shaft $k'$ to hold the disk $k$ and the shaft in proper position. The movement of the sleeve relatively to the lever K is limited by means of the devices indicated in Fig. 6. As there shown, the lever is provided with two lugs $k^{11}$, while a pin $k^{12}$ is secured to the sleeve. The sleeve is connected with the lever K by means of a spiral spring $k^{13}$. By this means the disk $k$ is permitted to have a slight angular movement relatively to the end of the form, which is sufficient to allow the disk to adjust itself to the bottom when the lever K is operated to press the bottom against the form. The left-hand end of the lever K is secured to a vertical shaft $K^2$, mounted in bearings on the front left-hand end of the main frame, as indicated in Fig. 1. An arm $K^3$ is secured to the end of the shaft $K^2$, and to the right-hand end of this arm is jointed a rod $k^4$, which is connected, through the medium of the yielding device $K^6$, to the lower end of the oscillating lever $K^4$, the upper end of which engages a disk $I^X$, having a cam-groove $I^2$. The yielding device $K^6$, Fig. 30, consists of a casing $k^{15}$, which is provided with a rearwardly-projecting arm $k^{16}$, jointed to the lower end of the lever $K^4$. The rod $k^4$ extends into the casing $k^{15}$ and has secured to its inner end a disk $k^{17}$. The front end of the casing is closed by a disk $k^{18}$, which has a central opening to permit the rod $k^4$ to pass freely through it. Between the disks $k^{17}$ and $k^{18}$ is interposed a spiral spring $k^{19}$. Thus a yielding connection is provided between the arm $K^3$ and the lever $K^4$. To the lower end of the shaft $K^2$ is also secured an arm $K^7$, to which is attached a spring $K^8$, secured at its opposite end to the main frame. So long as the upper end of the lever $K^4$ rests against the flange of the disk $I^x$ the disk $k$ on the pressure-lever is held firmly against the bottom piece of the basket during the formation of the basket; but as soon as the basket is finished the upper end of the lever $K^4$, which preferably carries a roller, as shown, enters the cam-notch $I^2$, being drawn into this notch by the spring $K^8$. At the same time the pressure-lever swings away from the completed basket and allows the ejector to remove the basket from the form. When the end of the lever $K^4$ rides out of the cam-notch $I^2$, the pressure-lever is made to move forward toward the form and press a bottom piece into engagement therewith. The yielding device $K^6$ adapts the mechanism to bottoms of varying thicknesses, as it will be seen that when the pressure-lever is moved toward the form the strain is applied through the spring $k^{19}$, which is a heavy stiff spring holding the bottom against the form firmly at all times, but yielding when necessary to accommodate an unusually thick piece of material.

The bottoms are fed to the form while the latter is in a horizontal position, as shown in Fig. 1, with its right-hand end under the nailing mechanism.

The side pieces and bands are next fed from their magazines to the form. The sides Y are stacked in a magazine L, arranged on the right-hand side of the machine, near the front thereof and above the form. Brackets $A^2$, secured to the main frame, support the magazine, as shown in Figs. 12, 12$^a$, and 13. The tops of the brackets are inclined downwardly to the left and also forwardly and the magazine L is correspondingly inclined. It is preferably provided with vertically-arranged trough-plates $l$, which are secured at their lower ends to the brackets $A^2$ and have a vertical space between them, as indicated in Figs. 13 and 14. The trough-plates are also cut away at $l'$ between their upper and lower ends in order that side pieces may be supplied to the magazine when desired. The lowermost side piece rests on curved rails $l^3$, while weights $l^4$, with curved or convex lower ends, rest on the top side piece of the pile directly over the rails. The weights are mounted to slide vertically in guides in the trough-plates $l$, and they are suspended by cords or chains from pulleys $l^5$, mounted on the crank-shaft $l^6$, by means of which the weights may be raised at any time—as, for instance, when it is necessary to supply more side pieces to the magazine. The movement of the crank-arm $L^{10}$ is limited by a stop $l^{20}$, which allows the weights to descend low enough to act on the last side piece. The result of this arrangement is to straighten out the sides should they tend to buckle, which is very often the case, and as the means for straightening out the sides is applied to the edges of the sides the weight of the pile is confined in some degree to the edges of the sides instead of being distributed throughout their entire surface. The lower ends of the trough-plates $l$ are cut away to allow the slide $L^2$ to reciprocate and to allow only one side piece at a time to be delivered from the magazine.

The side pieces are delivered one at a time from the magazine by means of a sliding plate $L^2$, mounted in guides $l^7$ on the brackets $A^2$ and connected by means of a link $l^8$ with an oscillating lever $L^3$, secured to the sleeve $L^4$, loose on the shaft $h^3$, and provided with an arm $L^5$, connected by a rod $l^9$ with a lever $L^6$, operated in one direction by a cam $I^3$ on the cam-shaft C. It is operated in the opposite direction by a spring $L^{40}$, attached to the main frame and to an arm $l^{30}$, projecting downwardly from the sleeve $L^4$. (See Fig. 2.) The shape of the slide $L^2$ in cross-section is shown in Fig. 13. The edges of the slide rest on the rails $l^3$, and these edges are arranged slightly above the main body of the slide, which portion of the slide is depressed below the top surfaces of the rails. The result of this arrangement is to cause the slide $L^2$ to engage the bottom side piece at its opposite edges only, and thus apply the force necessary to move the bottom side piece from the magazine at those points which bear the greatest weight and where there is apt to be the greatest tendency for the sides to lie regularly.

The side pieces are delivered by the slide $L^2$ from the magazine to the pocket $L^7$, mounted on a bracket $L^8$, secured to the main frame. A guard $L^{14}$ prevents the sides from rising in passing from the magazine to the pocket $L^7$. This pocket is arranged on the left-hand end of a casting $L^9$, which guides the slide M, that feeds the side pieces, and also the bands to the form. The pocket has a top plate $l^{10}$, secured by a spring-catch $l^{11}$ to the casting $L^9$ at its front end. The rear under face of the top plate is flared at $l^{12}$ to guide the side pieces Y into the pocket, and beneath this lid there is a guide-plate $l^{13}$, suitably shaped to receive the side pieces from the magazine. Within the pocket and at the front end thereof there is a supporting-plate $l^{14}$ to receive the front end of the side piece when it is moved to its full extent forward. After the side piece is delivered to the pocket in the manner illustrated in Fig. 12 it is fed to the form by means of the slide M, the construction and operation of which will be hereinafter described.

Before passing to the form the side pieces pass to a table N. (Shown in detail in Figs. 7 and 17.) This table is provided with guides $n$ to receive the side pieces. When the table is in the position shown in full lines in Fig. 6, it receives a side piece. When the table delivers a side piece to form one of the curved ends of a basket, the table is shifted to the position shown by dotted lines in Fig. 6. When it delivers a piece to form a part of the side of the basket, it is shifted to a less extent. By this means the side pieces are made to properly aline with the top and bottom of the basket. The table is carried by an upright bar N', the lower end of which is bent, as shown in Fig. 1, and provided with a sleeve $n^2$, mounted to turn with a shaft $n^{10}$, which has a general vertical direction, but is slightly inclined, as shown in Fig. 1. The sleeve $n^2$ is provided with an arm $n^3$, connected by a rod $n^4$ with a lever $N^3$, Fig. 2, operated by a cam $I^4$ on the cam-shaft C. The arrangement is such as to hold the table in the position shown in full lines in Fig. 6 while side pieces are being fed, but to incline it when the side pieces are being fed to the form. The bar N' is moved in one direction by the cam $I^4$ and in the other direction by a spring $n^{10}$, connected with the main frame and also connected by means of a rod $n^{11}$ with an arm $n^{12}$, projecting from the sleeve $n^2$. The table is provided, Fig. 6, with a pivoted finger $n^6$, pressed by a spring $n^7$. This finger is adapted to bear against one side edge of a side piece and press it into the opposite guide $n$ in the plate. By this arrangement the guides are sufficiently open to permit the easy entrance of a side piece, while the spring-finger insures that the side piece shall be held in the table in correct position to be delivered properly to the form. It also readily yields when a side piece is being delivered from the table to the form.

The bands Z Z' $Z^2$ are stored in separate compartments in a magazine O. This magazine is mounted on the casting $L^9$, in which is formed the guide for the slide M, and this casting is in turn mounted on the bracket $L^8$, supported on the main frame. The magazine is provided with three compartments $o$ $o'$ $o^2$, and each of the compartments is formed in separate castings, secured to the casting $L^9$—as indicated, for instance, in Figs. 19 and 20. The upper bands are arranged in vertical piles in the compartments $o$ and $o'$. At their lower ends the piles of bands rest on band-shifters $O^2$, which are adapted to slide transversely of the compartments in guides beneath them. Only the front ends of the bands are arranged in these compartments. Their outer or rear ends may be supported on any suitable frame. (Not shown in the drawings.) The ends of the lower bands project somewhat beyond the two piles of upper bands—as indicated, for instance, in Fig. 18, where it will be seen that the compartment $o^2$ is arranged slightly in advance of or to the left of the compartments $o$ $o'$. There is a single band-shifter $O^2$ for each pile of bands. Each of them is provided with a shoulder $o^4$, which is adapted to impinge against the lowermost band in one of the compartments $o$ or $o'$ or the uppermost band in the compartment $o^2$. The surfaces of the band-shifters $O^2$ are curved, so that the bands will bear on a surface of small extent, and they are hollowed, as shown at $o^{30}$ in Fig. 22, to provide for lateral irregularities in the bands. Some bands are straight and flat, while others are slightly curved, as indicated in Fig. 22. The construction of the band-shifters adapts them to bands of varying shapes. The inner sides of the compartments are cut away, as shown, to allow the bands to pass one at a time from the compartments when moved by the band-shifters.

The band-shifter for the bands Z' is connected to a lever P, which is in turn connected to a rock-shaft P', mounted in bearings in hangers $P^2$. The band-shifter for the bands Z is connected to a lever $P^3$, secured to a rock-shaft $P^4$, provided with an arm $P^5$, connected by a rod $P^7$ with the lever P. The band-shifter for the bands $Z^2$ is connected by a lever $P^8$ with the rock-shaft $P^4$, as indicated in Fig. 18. This shaft carries an arm $p^9$, to which is jointed a rod $p^{10}$, connected with a lever $p^{11}$ on a shaft $p^{13}$, which carries a lever $P^{14}$, operated in one direction by a cam-groove $I^5$ in the cam-disk $I^\times$ on the shaft C. The lever $P^{11}$ is operated in the opposite direction by a spring $p^{40}$. (See Fig. 2.) By this means the band-shifters are operated to deliver the bands laterally from their compartments. Bars $O^5$ rest on top of the piles Z Z' to hold their inner ends in place. These bars are provided with curved ends $o^7$, which rest on the bands Z Z' just over the curved recesses in the shifters, and a bar $O^6$, corresponding in shape to the bars $O^5$, is arranged beneath and supports the pile of bands $Z^2$. Each of the bars $O^5$ and $O^6$ is pivoted at one end and is also drawn toward the corresponding pile of bands by a spring $O^{10}$ in the manner indicated in Fig. 18. The inner ends of the bands when supplied to the machine abut against the ends of the compartments and are delivered therefrom laterally through the spaces $o^{13}$, as indicated in Figs. 19 and 20. The bars $O^5$ $O^6$ are provided with handles $o^{14}$ at their outer ends, by means of which they may be lifted when the machine is being supplied with additional bands. As the bands sometimes vary in width, it is desirable to provide yielding connections for the shifters, so that while the bands may be fed laterally to the proper extent at each operation they shall not be crushed. For this purpose each of the levers P $P^3$ $P^8$ is bifurcated at its upper end, as indicated in Fig. 22, and connected with the shifter by means of a pin $p^{20}$, which enters this bifurcation. Each of the levers has secured to it a spring $p^{21}$, which bears on the end of the band-shifter. The effect of this construction will be readily understood. A limited amount of movement of the lever relatively to the shifter is permitted. When the lever operates to move the shifter inwardly, it does so positively and without yielding when the bands are of normal width, but when an unusually wide band is encountered the spring $p^{21}$ yields during the inward movement of the lever, and thus while the band is properly placed in the holding devices of the transfer-slide $M^{10}$ it is not crushed or in any way injured while thus being inserted.

The upper bands are directed to the form by guides Q, which are preferably tubular, as shown in cross-section in Fig. 17, while the lower bands are directed to the form by a tubular guide $q^{10}$. These guides extend to the form adjacent to the nailing mechanism, as indicated in Fig. 14. When the bands are first moved toward the form, they are grasped by springs $q$ at the mouth of the guides.

The table N is cut away at $n^{20}$ to receive the slide M at the end of its forward stroke, the slide being operated to feed the bands and the side pieces in such manner that they shall be delivered below the nailing mechanism in position for nailing.

For the purpose of conveying the bands from their magazine to the form two slides M and $M^{10}$ are employed. The slide $M^{10}$, which is termed the "transfer-slide," receives the bands as they are delivered from their compartments by the band-shifters and transfers them to the guides Q, from which they are taken by the slide M, which latter slide conveys the bands to the form. Both slides M and $M^{10}$ are mounted to reciprocate in guides in the casting $L^9$. The slide $M^{10}$ is provided with a downwardly-projecting lug $m^{50}$, which is connected by a link $m^{51}$ with a lever $M^{50}$, secured to the front end of a rockshaft $M^2$, which is mounted in bearings in brackets $m^2$, projecting from the right-hand side of the machine. To the opposite or rear end of the rock-shaft $M^2$ is secured an arm $M^{51}$, which is connected by means of a link $m^{55}$ with the one end of a rocking bell-crank lever $M^{54}$, mounted in bearings in a bracket $m^{52}$ at the rear end of the machine. This rocking lever carries a roller $m^{53}$, engaging a cam $I^{50}$, secured to the rear end of the shaft C. This cam acts to move the slide $M^{10}$ toward the magazine. The slide is moved in the opposite direction by a spring $m^{54}$, which connects the lever $M^{51}$ with the frame of the machine in the manner shown in Fig. 1.

The slide M is provided with a downwardly-projecting lug $m$, connected by a link $m'$ with a lever $M'$, secured to a sleeve $M^\times$, surrounding the rock-shaft $M^2$ and adapted to move independently thereof. A spring $m^\times$ draws the lever $M'$ in one direction. From the sleeve $M^\times$ projects an arm $M^3$, which is connected by a rod $M^4$ with the lower end of a lever $M^5$, pivoted to the frame and having at its upper end a roller $m^4$, bearing against a cam $I^6$ on the cam-shaft. This cam is constructed to so operate the lever $M'$ as to retract the slide M. The slide is advanced by the spring $m^\times$, above referred to. The cam $I^6$ is so formed that six consecutive movements are given to the slide M. Each movement of the slide M feeds a side-piece. The slide M is provided at its inner end with a projection $m^7$, which is adapted to abut against a side piece held in the pocket $L^7$ and to transfer it therefrom to the table N, the table being cut away at $n^{20}$ to enable the projection of the slide to enter in order that the side piece may be properly fed to the form.

The slide $M^{10}$ is formed with two upwardly-extending arms $m^8$, provided with bearings for the small transverse shaft $m^9$, on the opposite ends of which are secured collars $m^{10}$, provided with upwardly-extending pins $m^{11}$. Between the frames $m^8$ is arranged an arm $m^{12}$, which projects from a sleeve $m^{21}$, secured to the shaft $m^9$, and to this arm is connected a link $m^{13}$, which in turn is connected to an arm $m^{14}$, secured to a small shaft $m^{15}$, mounted in bearings on the slide, as indicated in Figs. 14, 15, and 16. The collars $m^{10}$ are provided with two downwardly-extending dogs $m^{16}$, and the shaft $m^{15}$ is provided with a downwardly-extending dog $m^{17}$. These dogs are adapted to engage with the upper and lower bands and hold them firmly while they are being fed toward the main slide M. Pins $m^{19}$ project laterally from the slide $M^{10}$, and the bands are delivered by the shifters $O^2$, above the pins $m^{19}$, in the manner indicated in Fig. 15, and the dogs $m^{16}$ press against the bands above the pins. A similar pin $m^{18}$ projects from the slide below the dog $m^{17}$ for a similar purpose. One of the sleeves $m^{21}$ is provided with two notches $m^{22}$ $m^{23}$, in which a spring $m^{24}$, secured to the slide, is adapted to bear, the arrangement being such that the spring will hold the dogs in either of two positions until they are moved positively out of these positions. A similar spring $m^{25}$ is adapted to bear in corresponding notches in the hub or sleeve to which the dog $m^{17}$ is connected. The pins $m^{11}$ are adapted to engage with pins $r$, projecting inwardly from the inner sides of the compartments $o\,o'$, and also with pins $r^{10}$, projecting inwardly from brackets $R^{10}$, that are attached to the casting $L^9$. When the slide $M^{10}$ moves to the right, as seen in Fig. 14, the pins $m^{11}$ will strike against the pins $r$. This will cause the dogs $m^{16}$ $m^{17}$ to move into the position shown in Fig. 15, so as to grasp near their forward ends the bands which have been moved laterally into position beneath the dogs by the band-shifters. The slide $M^{10}$ next moves forward or toward the slide M. As the slide $M^{10}$ completes its movement to the left the pins $m^{11}$ will strike the pins $r^{10}$ on the brackets $R^{10}$, thus causing the dogs $m^{16}$ $m^{17}$ to be raised out of engagement with the bands, which are then held in place by springs $q$ at the mouth of the guides.

The slide M is equipped with devices similar to those shown in Figs. 15 and 16 for grasping the bands; but, as will be observed by reference to Fig. 20$^a$, the dogs $m^{16}$ and $m^{17}$ are adapted to extend through slotted openings in the guides Q $q^{10}$. The pins $m^{18}$ $m^{19}$ are also provided with lugs $m^{60}$, which project through slots in the guides Q $q^{10}$. The organization is such that the transfer-slide $M^{10}$ receives the bands and feeds them to the slide M. The slide M carries the bands to the form. The pins $m^{11}$ on the slide M are operated by pins $r'$ $r^\times$, projecting from the brackets R, the operation being similar to that described in connection with the slide $M^{10}$.

The construction of the cam for operating the slide $M^{10}$ is shown in Fig. 39. The construction of the cam for operating the slide M is shown in Fig. 38. Assuming that the slide $M^{10}$ is at the limit of its stroke to the right, it will then be in position to receive bands from the magazine. The devices before described on the slide will take hold of the forward ends of the bands. The slide $M^{10}$ is then advanced and presents the ends of the bands to the tubular guides Q in the manner indicated in Fig. 14. Then the slide $M^{10}$ retreats or moves to the right and takes a new hold on the bands and in the next forward movement feeds the bands forward or to the left to a greater extent. The slide M (when in the position shown in Fig. 14) grips the bands (by means of the devices before described) and feeds the bands toward the form with the last side piece of the basket just being completed. Then the slide M retreats or moves to the right and takes a new hold on the bands. This time the front ends of the bands will project from the front of the slide M. Then the slide M moves forward again or toward the form, carrying the bands with it and also carrying the first side piece of the new basket. At the end of this forward movement the nailing devices operate to secure the bands to the first side piece. After this the slide M is reciprocated back and forth to feed additional side pieces without feeding bands, the slide $M^{10}$ at this time being at rest. The function of the slide $M^{10}$ is to take the bands from the magazine and transfer them to the slide M, which latter carries the bands to the form. This enables the slide M to make shorter strokes than it would if it moved all the way from the magazine to the form.

It is desirable that the side pieces of the basket should overlap each other along their vertical edges. For this purpose what is called a "tucker" is employed. It consists of a plate W, (see Figs. 1, 23, and 24,) adapted to project below the rear or right-hand edge of a side piece and hold it up while a succeeding side piece is being fed forward. The plate is pivoted at $w$ to a lever $W'$, pivoted at $w'$ to a hanger $v$, which carries the nailing mechanism. The plate W normally rests on the table N, its left-hand or forward end being held against the table by a spring $w^2$, arranged and attached as clearly shown in the drawings. A connecting-bar $w^3$, jointed to the upper end of the lever $W'$, is connected at its opposite or right-hand end to the upper end of a bell-crank lever $W^3$, (see Fig. 1,) rocking on a pin $w^4$. The opposite end of the bell-crank lever projects into the path of the slide M. In the operation of the machine as the slide M moves forward to feed the side pieces it strikes the lower right-hand end of the bell-crank lever, causing it to rock, and through the connecting-rod $w^3$ the lever $W'$ is caused to swing toward the nailer-head. The plate W will thus be made to pass beneath the side piece previously fed and raise it slightly, while the advancing side piece will be directly beneath the plate, thus causing the sides to lap.

On the return of the slide M the lever $W'$ is drawn to its normal position by a spring $W^5$.

In this machine wire staples are used for securing the parts of the basket together. The staples are formed from continuous lengths of wire fed from spools S S', mounted on a bracket $S^2$, secured to the bottoms-magazine G. The wire is fed to feed-rolls $S^4$, $S^5$, $S^6$, and $S^7$. The feed-rolls $S^4$ and $S^6$ are properly connected with a shaft T, mounted in bearings on a bracket T', attached to the nailer-head V. The feed-rolls $S^5$ and $S^7$ are much smaller than the rolls $S^4$ and $S^6$, and they are carried by levers $T^2$, the lower ends of which are pivoted at $t$ to the bracket T', and the upper ends are connected by means of springs $T^3$ to a bracket $T^4$, bolted to the bottoms-magazine G. The feed-wheels are all grooved in the manner indicated in Fig. 27, and the wheels $S^4$ and $S^5$ are geared together, while the wheels $S^6$ and $S^7$ are similarly geared, as indicated in Figs. 24 and 25. The wires for the staples pass down between the wheels, as indicated, for instance, in Fig. 27. On the shaft T is secured a ratchet-wheel $T^8$, with which engages a pawl $T^9$, carried by a bell-crank rocking lever $T^{10}$, loose on the shaft T, and to which is connected a link $T^{11}$, jointed to an arm $T^{12}$ on a rock-shaft $T^{13}$. The rock-shaft is provided with an arm $T^{14}$, carrying a roller $t'$, engaging a cam $I^7$ on the cam-shaft C. The cam operates the arm $T^{14}$ in one direction. It is moved in the opposite direction by a spring $T^{40}$, attached to the arm and to the main frame. (See Fig. 23.) By this arrangement the feed-wheels are properly driven to feed the requisite amount of wire forward at each step to form a staple for the upper bands and also one for the lower bands. The wire U is formed into staples for the bottom of the basket, while the wire U' is formed into staples for the top of the basket. The wire U passes through a hole $u$ in the nailing-head. The wire U' is guided by a tube $u^2$, and from this tube the wire passes through a hole $u^3$ into the nailer-head at the top of the basket.

A nailer-head V is suspended by means of a hanger $v$ from a shaft $T^5$. The sleeve $v'$ of the hanger is elongated, as shown in Figs. 23 and 24, and it is free to rock on the shaft $T^5$. It only rocks to a small extent for the purpose hereinafter described. The nailer-head V is shaped at its lower end $v^3$ to conform approximately to the shape of the basket and to provide for clearance when the basket is knocked off, and in cross-section it is of the form shown in Fig. 29. At its right and left hand ends the nailer-head is formed with vertical openings V', through which the staple-formers $V^2$ slide vertically. Each staple-former is preferably made up of two plates $v^{20}$, between which are arranged bars $v^{21}$, that are bolted to the plates in the manner indicated in Fig. 27. There is a space between the bars $v^{21}$, in which the drivers reciprocate in the manner hereinafter described. Each staple-former carries a knife or cutter $V^3$, which is secured in place in the manner indicated in Fig. 27. The wires U U' enter the openings $u u^3$ and project across the lower end of the staple-formers, as indicated in Figs. 27 and 29. When the staple-formers descend, the cutters $V^3$ cut the wire into staple lengths. Preferably wearing-plates $v^{22}$ are employed to receive the ends of the wires that are fed into the nailer-head below the staple-formers and they serve to keep the wires centrally arranged. The staple-formers are connected to an oscillating frame $V^5$, which at its rear end is connected with sleeves $V^6$, free to turn on a shaft $V^7$. One of the sleeves has an arm $V^8$, carrying a roller $v^5$, bearing against a cam $l^{20}$ on the cam-shaft C. A spring $V^9$, secured to an arm $v^6$, projecting from this sleeve, moves the frame $V^5$ in one direction—that is, in the direction to raise the frame $V^5$, while the cam $l^{20}$ moves the frame in the opposite direction to form the staples. The connections between the frame $V^5$ and the staple-formers are loose ones. As indicated in Fig. 27, the arms of the frame rest upon and bear upon spiral springs $v^{30}$, arranged in sockets in the upper ends of the staple-formers, and these ends of the frame are arranged below arms $v^{31}$ of brackets, which are secured to the upper ends of the staple-formers. The arrangement is such that the staple-formers are moved downwardly with sufficient force to form the cut wire into staples, but yet not so suddenly as to cause the wire to be cut on the anvils, which latter will be hereinafter described. The arms $v^{31}$ afford means for lifting the staple-formers. In the lower end of the nailer-head are formed transverse openings $v^7$, in which reciprocate the anvils $V^{10}$. These anvils are connected at their outer ends with levers $V^{12}$, hinged to brackets $v^{40}$, projecting from the hanger $v$. The levers $V^{12}$ are bent at their lower ends and provided with inclined surfaces $v^0$, against which bear the inclined lower ends of vertically-arranged bars $V^{30}$, which are connected with the staple-driving mechanism next to be described. It will here be stated, however, that the arrangement is such that the anvils will be in position beneath the staple-formers and beneath the wire while the staple-formers are descending and the cut wire is bent around the anvils; but when the drivers descend to insert the staples into the basket the rods $V^{30}$ cause the levers $V^{12}$ to swing outward and withdraw the anvils, so that the staples may pass. The rods $V^{30}$ are hung loosely and find their proper position by gravity. The levers $V^{12}$ are drawn inward, so as to move the anvils into place beneath the staple-formers, by means of springs $v^{32}$, and when the anvils are moved outward they are moved against the force of these springs. Each driver $V^{18}$ consists of a flat wide bar of steel, the upper end of which is pivotally connected with a link $v^{33}$, connected with the lever $V^{17}$. Between the headed upper end of each driver and staple-former is interposed a block $v^{34}$, which serves as a stop for the driver, and between the upper end of this block and the headed end of the driver is interposed a spring $v^{35}$, which spring forces the former down on the band in advance of the driver. After the staples have been formed the springs $v^{30}$ tend to still further depress the staple-formers, and thus hold them firmly against the bands. When the drivers are descending, they first tend through the springs $v^{35}$ to still further depress the staple-formers, so that they are caused to press firmly on the bands. The further movement of the drivers inserts the staples. The springs $v^{35}$ also allow for variations in thickness of material. The levers $V^{17}$ are sleeved on the shaft $T^{13}$. They are loose thereon and have a limited rocking motion vertically. At their inner ends the levers $V^{17}$ are connected with the vertical bars $V^{30}$ and with the links $v^{33}$. An arm $V^{31}$, loose on the shaft $T^{13}$, is connected by means of a link $V^{32}$ with an arm $V^{33}$, fast on the shaft $V^7$. The arm $V^{32}$ carries two laterally-projecting pins $v^{25}$, which project beneath the levers $V^{17}$, so that when the arm $V^{33}$ is raised the levers $V^{17}$ are also raised. The levers $V^{17}$ are provided with upward extensions $v^{17}$, to which are secured springs $v^{18}$, connected at their opposite ends with a bracket on the main frame. The levers $V^{17}$ are thus bell-crank levers, moved in one direction by the springs $v^{18}$ and in the opposite direction from the shaft $V^7$ in the manner before described. It will be observed that the springs $v^{18}$ exert the force which moves the drivers inward to drive the staples. Thus a quick sudden movement is given to the drivers, which drives the staples quickly and positively and yet with a yielding pressure. The parts are all so timed that the proper amount of wire is fed forward at each step, and the staples are formed prior to the descent of the drivers. The drivers force the staples into the basket while the form is moving. If the nailer-head were stationary, it would produce a drag, which would result in the imperfect operation of the nailing mechanism; but, as before described, the nailer-head is swung from the rod $T^5$. While a staple is being driven into the basket the nailer-head will be moved slightly with the form, being dragged by the staple after it is driven part way into the basket. As soon as the staple is driven home the nailer-head is swung back by a spring $t^{20}$, secured to the hanger $v$ and to a bracket on the frame of the machine. (See Fig. 1.) The backward movement of the hanger is limited by a stop on the frame, against which the arm $t^{21}$ strikes. The nailer-head assumes its normal position in time to permit other staples to be driven into the basket as it proceeds in its formation. The staples need not be very close together, there preferably being twelve or thirteen staples for the top bands and a similar number for the bottom bands, and in an oblong basket there is considerable space between the staples, which will permit the nailer-head to oscillate in the manner above described without interfering with the proper operation of the mechanism. After the nailing operation is finished the basket is completed, and it remains only to eject the basket from the form. This is accomplished by means of an ejector $B^3$. (See Fig. 5.) This ejector is attached, by means of a link $b^3$, to the upper end of a long lever $B^4$, Figs. 1 and 2, secured at its lower end to a sleeve $B^5$ on the shaft $B^{15}$. This sleeve is provided with an arm $B^6$, connected by a rod $B^7$ to a curved lever $B^8$, Fig. 30, operated by a cam $I^8$ on the cam-shaft C. The lever $B^4$ is drawn in one direction by a spring $B^9$. The ejector is operated after the completion of a basket and moved forward to eject the basket from the form.

It will be observed that the cams are all single-actuating. The levers which they operate are provided with rollers, and the levers are drawn against the cams by springs. The cams $I^6$, $I^7$, $I^{20}$, and $I^{22}$ are fastened to the cam $I'$ by four bolts $i$. The cams $I'$ and $I^{50}$ are fast to the shaft C. The remaining cams, together with the spur-wheel $c$, are all practically secured together and attached to the shaft C.

There is another feature which has not yet been described which is of importance. For the most efficient operation of the machine it is found that some means must be provided for holding the inner band $Z^2$ against the form E until the first staple has been driven. This is accomplished by the devices shown particularly in Fig. 5. The form E is provided with a recess $c^4$, in which is pivoted clamping device $C^2$. This device has a finger $c^5$, projecting beyond that part of the form which receives the end of the inner band. The opposite end of the device $C^2$ is provided with a lug $c^6$, which is adapted to bear against a cam-lug $c^7$ on the plate $e^{22}$. A spring-plunger $c^8$ is arranged in the form, and its headed end is provided with a spur $c^9$, adapted to enter either of the two notches $c^{10}$ in the clamping device $C^2$ to hold the device either open or closed. When the form moves to the left just as a basket is being completed, the lug $c^6$ rides under the cam $c^7$, and the finger $c^5$ is raised, as indicated in Fig. 5, thus releasing the inner band used in the construction of the basket just completed. While the finger $c^5$ is thus raised a new band for the inner band of the new basket is inserted between the finger and the form. The finger is held raised by the spring-plunger $c^8$ during this dwell in the movement of the form between the completion of one basket and the commencement of a new one. In order to close the finger down upon the band, a spring-bolt $C^6$ is employed. This bolt is indicated in Fig. 4 and also in Fig. 28. It slides vertically between lugs $c^{12}$ on the nailer-head V, between which is interposed a spring $c^{13}$, which at its upper end bears against a pin $c^{14}$ on the bolt. The lower end of the bolt is normally raised above the finger $c^5$; but when the frame $V^5$ of the staple-forming mechanism descends to form the first staple the bolt is depressed and strikes against the finger $c^5$, overcoming the force of the spring-plunger $c^8$ and causing the finger to clamp the end of the band, the finger being held thereafter in engagement with the band by the spring-plunger, which enters the uppermost notch $c^{10}$ and remains there until the basket is being completed, when the finger is raised by the cam $c^7$, as before described. The lower end of the bolt $C^6$ is made to swing on a hinge $c^{15}$, but is pressed in one direction by a spring $c^{19}$. By this arrangement the form, with the finger, may pass the bolt $C^6$ without injury.

The operation of the several mechanisms for assembling the component parts of the basket and securing them together has been fully described while describing the details of construction of the several mechanisms. Briefly stated, however, the operation of the entire machine is as follows: In starting the form is in a nearly central position. At this time a bottom board is fed into position in front of the form, and then the pressure-lever forces the board tightly against the form and remains there during the formation of the basket, and at the same time the first side board and bands are fed into position and the first staple driven. Then the form commences to move, and the staples are constructed and driven in the proper places as the form continues to move and the sides and bands are fed in. After the basket is completed the form stops moving, the pressure-lever is thrown out away from the basket, and the ejector is operated to remove the basket from the form. While the form is still stationary another bottom board is fed into position. The pressure-lever again comes up against the board, and after the first side pieces and the bands are fed to the form the form commences to rotate again and a new basket is constructed in the manner before described.

What is claimed herein as the invention of OTTMAR MERGENTHALER is—

1. The combination with a magazine for holding the bottoms in a vertical pile, a slide for delivering the bottoms, one at a time, therefrom, a narrow vertical chamber into which the bottoms are discharged, a form adapted to move about a horizontal axis, and the end of which is in line with the narrow vertical chamber, and a slide moving through the vertical chamber and delivering bottoms to the form.

2. The combination of a magazine for holding the bottoms in a vertical pile, a slide for delivering the bottoms, one at a time, therefrom, a narrow vertical chamber into which the bottoms are discharged, a form adapted to move about a horizontal axis, and the end of which is in line with the vertical chamber, a slide moving through the vertical chamber and delivering bottoms to the form, and means for pressing the bottoms against the end of the form.

3. The combination with a magazine for the bottoms, of a slide for delivering the bottoms one at a time from the magazine, a form, a carrier for transferring the bottoms one at a time from the magazine to the form, yielding devices on the carrier for gripping the bottoms, and a pressure-lever carrying devices for holding the bottom piece against the form during the construction of the basket.

4. The combination with a magazine for the bottoms, of means for delivering the bottoms, one at a time from the magazine, a chamber into which the bottoms are discharged, a form and a carrier for delivering the bottoms from the chamber to the form, comprising a slide-bar, a lever for operating the slide-bar and which is adapted to bear against one end of a bottom piece, and a spring-controlled arm carried by the slide-bar adapted to bear against the opposite end of the bottom piece.

5. The combination with a magazine for flexible sides in which they are arranged in a vertical pile, of rails for supporting the opposite ends only of the flexible sides, weights bearing on the sides over their opposite edges above the rails, and a slide for delivering the sides from the magazine.

6. The combination with a magazine for flexible side pieces, in which they are arranged vertically flatwise, of means for supporting the opposite edges only of the side pieces, weights with curved lower ends bearing on the sides above their points of support, and a slide for delivering the sides from the magazine.

7. The combination with a magazine for flexible side pieces, of means for supporting a vertical pile of sides at their opposite ends only, means for pressing the pile downwardly, and a slide for delivering the side pieces from the magazine which has its opposite edges raised above its central portion.

8. The combination with a form about which the basket is constructed, of a magazine for the side pieces, a pocket for receiving the sides as they are delivered from the magazine, a slide reciprocating below the magazine for delivering the sides, one at a time, to the pocket, and another slide moving through the pocket at right angles to the first-mentioned slide, for transferring the side pieces into position on the form.

9. The combination with a form about which the basket is constructed, of a magazine for the side pieces, a pocket for receiving the sides as they are delivered from the magazine, a guard to prevent the sides from rising when passing from the magazine to the pocket, and another slide for moving the sides from the pocket to the form.

10. The combination with a form about which the basket is constructed, of a table arranged close to the form for directing the sides as they are delivered thereto, means for tilting the table, and means for delivering side pieces to the table.

11. The combination of a form about which the basket is constructed, a table arranged close to the form for delivering side pieces directly thereto, means for at times increasing the inclination of the table, and means for feeding side pieces to the table.

12. The combination of a form about which the basket is constructed, a table arranged close to the form for delivering the side pieces thereto, a sides-magazine, a slide for delivering the sides therefrom, and another slide moving at right angles to the first-mentioned slide, for delivering side pieces directly to the table.

13. The combination of a form, a table for delivering side pieces thereto provided with guides and a spring-finger arranged in one of said guides.

14. The combination of a form, a table provided with guides for side pieces, and guides for bands, arranged both above and below the table.

15. The combination of a form about which the basket is constructed, a sides-magazine, means for delivering the sides, one at a time, from the magazine, compartments for storing the bands in separate piles, and a slide which receives a set of bands from the compartments and delivers them to the form and also receives and feeds side pieces to the form.

16. The combination of a form about which the basket is constructed, a magazine for the bands, endwise a slide carrying bands from the magazine toward the form, means for transferring bands from the magazine to the slide before the slide moves toward the form, and means for guiding the bands to the form as they are being fed by the slide.

17. The combination with a form about which the basket is constructed, of a magazine for the bands, a slide for moving the bands endwise and delivering them to the form, and means for discharging the bands from the magazine and delivering them to the slide.

18. The combination of a magazine for the bands, a slide for delivering the bands from the magazine, a shifting-bar moving transversely of the magazine, its operating-lever, and a yielding connection between the shifting-bar and the operating-lever.

19. The combination of a magazine for the bands, a slide for delivering the bands from the magazine, and a shifter-bar for transferring a band from its compartment in the magazine, said shifting-bar being formed with a shoulder for engaging the side of the band and a curved recess near the shoulder for receiving the band.

20. The combination of a form about which the basket is constructed, a magazine for the bands divided into separate compartments, a slide for feeding bands from the magazine to the form, means for delivering the bands from the compartments to the slide, and devices for holding the bands on the slide while they are being fed to the form.

21. The combination of a form about which the basket is constructed, a magazine for the bands provided with separate compartments, a slide for feeding the bands to the form, devices for delivering bands from the compartments of the magazine to the slide, and devices for holding the bands while they are being fed forward by the slide.

22. The combination of a form about which the basket is constructed, a magazine for the sides, a slide for feeding the bands to the form, devices for feeding the bands from the magazine to the slide, pins on the slide which support the bands while being fed forward, a gripping device carried by the slide for holding the bands while engaged by the pins, and devices for tripping the gripping device at proper times.

23. The combination of a form about which the basket is constructed, a magazine for the sides, means for delivering the sides, one at a time, from the magazine, a magazine for the bands, means for delivering the bands therefrom, a slide and means for operating the slide to cause it to at first carry a side piece and the bands for a basket toward the form, and afterward during several successive strokes to feed side pieces, one at a time, to the form without feeding bands thereto.

24. The combination with a magazine for the bands in which they are arranged vertically flatwise, of supports for the bands at one end, shifter-bars for supporting the opposite ends of the bands, means for moving the shifter-bars transversely to carry the bands laterally from their compartments in the magazine, a slide to which the bands are delivered by the shifter-bars, and means for moving the slide in a direction parallel with the length of the bands.

25. The combination with a magazine for the bands in which they are arranged vertically flatwise, of curved supports for the ends of the bands, weighted bars having curved ends resting on the pile of bands over their curved supports, and means for delivering the bands one at a time from the magazine.

26. The combination with a magazine for the bands in which they are arranged vertically flatwise, a bar on which the bands are supported, and which bears on the end of the pile of bands, means for pressing the bar upwardly, and means for delivering the bands one at a time from the magazine.

27. A form for a basket provided on its exterior with an oval series of teeth, in combination with a spur-wheel gearing therewith, a hollow support for the form extending into an oblong opening therein, and an ejector operating through the hollow support.

28. A form for a basket provided with an oval series of teeth on its exterior, a spur-wheel gearing therewith, a sleeve extending through a longitudinal opening in the form and provided with a head arranged in an oval recess in the form, a square sleeve encircling the headed sleeve, and an ejector operating through the bore of the headed sleeve.

29. The combination of a form having an oblong opening, a support passing through said opening, blocks carried on the end of the form, and a guide-rail on which said blocks bear.

30. The combination of nailing devices, a form and a clamping device carried thereby adapted for holding the end of the inner band of the basket prior to the operation of the nailing devices, and means carried by the nailing devices for closing the clamping device.

31. The combination of a form, a clamping device having a finger adapted to engage with a band, a spring-bolt for holding the finger open or closed, and devices for opening and closing the finger.

32. The combination of the form, a pivoted clamping device carried thereby, a spring-bolt for holding the finger in either its opened or closed position, a stationary cam for opening the finger, and a rod operated by the nailing mechanism for closing the finger.

33. The combination with the form, of a pressure-lever, a sleeve pivotally connected therewith, a shaft carried by the sleeve, a disk on the shaft adapted to engage with a basket-bottom, a spring for moving the sleeve relatively to the pressure-lever, and stops for limiting the movement of the sleeve relatively to the pressure-lever.

34. The combination of a form, a pressure-lever, a disk carried on the end of the lever and free to rotate with the form and to tilt or oscillate, and a spring for causing the disk to assume a slight angular relation to the form.

35. The combination of a form, means for feeding side pieces thereto and devices for raising side pieces from the form while subsequent side pieces are being applied thereto.

36. The combination of a form, means for feeding side pieces thereto, a plate for elevating one edge of a side piece after its delivery to the form, and for guiding the next side piece into position on the form to underlap the first-mentioned side piece.

37. The combination of a form, a tucker-plate, devices operating by the sides-feeding mechanism to cause the tucker-plate to lift the edge of a side piece applied to the form, and means for moving the tucker-plate in the opposite direction.

38. The combination of a tucker-plate, a lever to which it is hinged, a spring attached to the lever and also to the heel of the tucker-plate, a bell-crank lever, connections between this lever and the lever which carries the tucker-plate, and a spring connecting the bell-crank lever with said tucker-plate-carrying lever.

39. The combination with a rotary form and means for assembling the component parts of a basket about the form, of wire-feeding devices and staple forming and driving mechanism mounted to move together while a basket is being constructed.

40. The combination of a form about which the basket is constructed, means for feeding blanks to the form, nailing mechanism mounted to move with the form while blanks are being fed thereto and while the securing devices are being applied and fastened.

41. The combination of a form about which the basket is constructed, means for operating the form, nailing mechanism, means for operating the nailing mechanism to form and drive the nailing devices, and means for suspending the nailing mechanism and allowing it to be moved with the form by the staple while the latter is being driven.

42. The combination with a movable form, of means for assembling the component parts of a basket about the form and nailing mechanism movable with the form during the construction of the basket.

43. The combination of a form which has both a straight and a rotary movement, means for assembling the component parts of a basket about the form, nailing mechanism swinging back and forth with relation to the form while the basket is being constructed, and devices for applying and fastening the securing devices while the blanks are being assembled and while the form is moving.

44. The combination of a form, means for moving it continuously while the sides and bands are being applied and fastened, means for stopping the movement of the form while the completed basket is being ejected and a bottom piece is being supplied, means for ejecting the basket and supplying a bottom piece, and means for thereafter moving the form during the construction of another basket.

45. A basket-making machine provided with a form, means for continuously moving the form during the operation of nailing and while the sides and bands are being assembled and applied to the form, and means for stopping the movement of the form while a basket is being ejected.

46. The combination of a form, means for rotating it, a nailer-head mounted to move with the form, the staple-formers reciprocating therein, cutters carried by the staple-formers, means for feeding wire to the staple-formers, anvils about which the staples are formed, means for inserting and withdrawing the anvils, staple-drivers for inserting the staples in the basket, and means for independently operating the staple formers and drivers while the nailer-head is moving with the form.

47. The combination of a rotary form, a nailer-head mounted to move with the form, staple formers and drivers, the frame loosely connected with the staple-formers for operating them, means for operating said frame, and means for operating the drivers.

In testimony whereof we have hereunto set our hand this 25th day of June, 1901.

[L. S.] SAFE DEPOSIT & TRUST CO. OF BALTO.,
*Executor.*
By J. J. NELLIGAN,
*Secretary.*
ABNER GREENLEAF,
*Executor.*

Witnesses:
ARTHUR C. GIBSON,
GEO. B. GAMMIE.